(12) United States Patent
Kang et al.

(10) Patent No.: US 7,926,076 B2
(45) Date of Patent: Apr. 12, 2011

(54) DISPLAYING ADVERTISEMENT ON USER TERMINAL

(75) Inventors: Moon-Soon Kang, Seongnam-si (KR); Jang-Hyuk Park, Goyang-si (KR)

(73) Assignee: KT Corporation, Seoul (KR)

( * ) Notice: Subject to any disclaimer, the term of this patent is extended or adjusted under 35 U.S.C. 154(b) by 499 days.

(21) Appl. No.: 11/895,208

(22) Filed: Aug. 23, 2007

(65) Prior Publication Data

US 2007/0294722 A1 Dec. 20, 2007

Related U.S. Application Data

(63) Continuation of application No. PCT/KR2006/000656, filed on Feb. 24, 2006.

(30) Foreign Application Priority Data

Feb. 25, 2005 (KR) .................. 10-2005-0015923

(51) Int. Cl.
*H04N 5/445* (2006.01)
*G06F 13/00* (2006.01)
*G06F 3/00* (2006.01)

(52) U.S. Cl. .............................. 725/60; 725/35; 725/51

(58) Field of Classification Search .............. 725/32–36, 725/40, 51, 60
See application file for complete search history.

(56) References Cited

U.S. PATENT DOCUMENTS

| 7,194,758 | B1 * | 3/2007 | Waki et al. | 725/141 |
| 7,444,659 | B2 * | 10/2008 | Lemmons | 725/34 |
| 2003/0139966 | A1 * | 7/2003 | Sirota et al. | 705/14 |
| 2004/0261100 | A1 * | 12/2004 | Huber et al. | 725/32 |

FOREIGN PATENT DOCUMENTS

| JP | 2000-268090 | 9/2000 |
| JP | 2001-117938 | 4/2001 |
| JP | 2001-313920 | 11/2001 |
| JP | 2002-024701 | 1/2002 |
| JP | 14091995 | 3/2002 |
| JP | 2002-135844 | 5/2002 |
| JP | 2002-318559 | 10/2002 |
| JP | 2003-169311 | 6/2003 |
| JP | 2003-242069 | 8/2003 |
| JP | 2003-244677 | 8/2003 |
| JP | 15244677 | 8/2003 |
| JP | 15284041 | 10/2003 |
| KP | 2000-0039950 | 7/2000 |
| KP | 2002-0023251 | 3/2003 |
| WO | WO 02091262 | 11/2002 |

OTHER PUBLICATIONS

Japanese Office Action dated Jun. 29, 2010 for JP 2007-556089.
Japanese Office Action dated Nov. 2, 2010 for JP 2007-556089.

* cited by examiner

*Primary Examiner* — Hunter B Lonsberry
(74) *Attorney, Agent, or Firm* — Knobbe Martens Olson & Bear LLP (57) ABSTRACT

A method of displaying an independent advertisement while providing a broadcasting service and a user terminal executing the method are disclosed. In one embodiment, the user terminal outputs broadcast data, received from a broadcasting system, during a broadcast program output period, then outputs stored advertisement data received earlier from an advertisement server or advertisement data received real time during a predetermined advertisement data output period, and outputs broadcast data received real time at the end of the advertisement data output period. According to at least one embodiment, a broadcasting device and an advertising device can be separated to have targeted advertisements delivered to a user during a commercial time of regular broadcasting, maximizing the effect of advertisement.

16 Claims, 6 Drawing Sheets

DISPLAYING ADVERTISEMENT ON USER TERMINAL

RELATED APPLICATIONS

This application is a continuation application, and claims the benefit under 35 U.S.C. §§120 and 365 of PCT Application No. PCT/KR2006/000656, filed on Feb. 24, 2006, which is hereby incorporated by reference.

BACKGROUND OF THE INVENTION

1. Field of the Invention

The present invention is related to a method of displaying an independent advertisement during broadcasting and a user terminal executing the method, particularly to a method and a user terminal that can maximize the effect of advertisement by selectively delivering appropriate advertisements to a user during a commercial time between regular programs while providing a broadcasting service using a user terminal.

2. Description of the Related Technology

Recently, a wide array of broadcasting services, such as sky wave broadcasting, satellite broadcasting, terrestrial digital multimedia broadcasting (DMB), and satellite DMB, are in service already, or under development, in combination with a variety of user terminals, such as mobile communication terminals and personal multimedia players (PMP).

SUMMARY OF CERTAIN INVENTIVE ASPECTS

One inventive aspect is a method of displaying independent advertisements during broadcasting and a user terminal executing the method that can maximize advertisement effects by separating the broadcasting apparatus and the advertising apparatus to deliver advertisements targeted to particular users during the commercial time of a regular program.

Another inventive aspect is a method of displaying independent advertisements during broadcasting and a user terminal executing the method that can maximize advertisement effects by displaying on the user terminal the most appropriate advertisement for a current status (e.g., time and location) among prestored advertisement data.

Another inventive aspect is a method of displaying independent advertisements during broadcasting and a user terminal executing the method that can streamline the shopping process and promote product sales by sending a request for purchase of a product corresponding to advertisement data through a wireless network if a preset purchase request is inputted when certain advertisement data is displayed.

Another inventive aspect is a method of displaying independent advertisements during broadcasting and a user terminal executing the method that can improve the usefulness of advertisement by displaying an advertisement according to the location of a user terminal.

Another inventive aspect is a method of displaying independent advertisements during broadcasting and a user terminal executing the method that enables the creation of a new revenue model by separating the subject of programs and the subject of advertisements.

Another inventive aspect is a method, system, device, and recorded medium for providing broadcast data and advertisement data from different providers to a user terminal.

Another inventive aspect is a method of supplying broadcast data to a user terminal in a mobile communication service system. The method includes storing one or more of advertisement data. Broadcast data and broadcast setting information are received from a broadcasting system through a communication network. The broadcast setting information includes broadcast time information and advertisement data output period information of a broadcast program corresponding to the broadcast data. The broadcast data and broadcast setting information are sent to a user terminal through a communication network. A request for transmission of advertisement data is received from the user terminal. One or more of advertisement data are extracted, and the extracted advertisement data is sent to the user terminal through a communication network. The user terminal sends the request for transmission of advertisement data at a time corresponding to the advertisement data output period information, and outputs the advertisement data during a period corresponding to the advertisement data output period information only.

In the above method for providing broadcast data, the step of extracting the advertisement data includes extracting location information of the user terminal and extracting advertisement data corresponding to the location information.

Another inventive aspect is a method, system, device, and recorded medium that store one or more of advertisement data and receive broadcast data and broadcast setting information from a broadcasting system through a communication network. The broadcast setting information includes broadcast time information and advertisement data output period information of a broadcast program corresponding to the broadcast data. The broadcast data is sent to a user terminal through a communication network. Then whether a current time corresponds to the advertisement data output period information is determined. If the current time corresponds to the advertisement data output period information, one or more of advertisement data are extracted, and the extracted advertisement data is sent to the user terminal through a communication network.

In the step of extracting the advertisement data, location information of the user terminal is extracted, and advertisement data corresponding to the location information is extracted.

Another inventive aspect is a user terminal that receives and outputs broadcast data and advertisement data from different providers.

Another inventive aspect is a user terminal. A wireless communication unit is provided to receive advertisement data from an advertisement server through a communication network. A broadcast signal receiving unit converts broadcast data, received from a broadcasting system through a communication network, to first voice data and first video data in a predetermined format. A storage unit stores terminal identification information and broadcast setting information corresponding to the broadcast data received from the broadcasting system or a mobile communication service system. The broadcast setting information includes broadcast time information and advertisement data output period information of a broadcast program corresponding to the broadcast data. A speaker outputs the first voice data. A display unit outputs the first video data. An advertising unit converts the advertisement data to second voice data and second video data in a predetermined format, and outputs through the speaker and the display unit, if a current time corresponds to the advertisement data output period information.

Implementations may include one or more of the following features. For example, a key input, with one or more key buttons, may be arranged to receive a channel selection instruction and a request for purchase. A purchase request information generating unit may be provided to generate purchase request information using the terminal identification information and an advertisement ID corresponding to advertisement data being displayed through the display unit. A transmitting unit can be also equipped to send the generated purchase request information to the advertisement server or a purchase server.

The storage unit also stores one or more of advertisement data received through the wireless communication unit, and the advertising unit actuates the advertisement data stored in the storage unit to be outputted according to the advertisement data output period information.

The user terminal can be a mobile communication terminal, a personal digital assistant, or a portable multimedia player.

Another inventive aspect is a program installed in a user terminal to receive broadcast data and advertisement data from a broadcasting system and an advertisement server, respectively, and output according to a predetermined output standard.

Another inventive aspect is a recorded medium tangibly embodying a program, readable by the user terminal, of instructions executable by a user terminal to perform a method for displaying an advertisement during broadcasting. The recorded medium stores one or more of advertisement data received from an advertisement server through a communication network. Broadcast data and broadcast setting information are received from a broadcasting system or a mobile communication service system. The broadcast setting information includes broadcast time information and advertisement data output period information of a broadcast program corresponding to the broadcast data. The received broadcast data is outputted. Whether a current time corresponds to the advertisement data output period information is determined, and if the current time corresponds to the advertisement data output period information, outputting the broadcast data and one of the stored advertisement data is stopped. Whether a current time corresponds to the broadcast time information is also determined, and if the current time corresponds to the broadcast time information, broadcast data received from the broadcasting system or the mobile communication system is outputted.

In case the advertisement data is stored to correspond to each of location information indicating a proper output location, the stored advertisement data can be outputted by transmitting a request for location information of the user terminal to the mobile communication service system, receiving location information of the user terminal from the mobile communication service system, extracting advertisement data corresponding to the received location information, and outputting the extracted advertisement data.

The above program may include one or more of the following steps. For example, a purchase request instruction may be received from the user. Purchase request information can be generated using an advertisement ID of advertisement data, outputted when the purchase request instruction is inputted, and pre-stored terminal identification information. The generated purchase request information may be transmitted to the mobile communication service system or the advertisement server.

Another inventive aspect is a recorded medium tangibly embodying a program, readable by the user terminal, of instructions executable by a user terminal to perform a method for displaying an advertisement during broadcasting. The recorded medium receives broadcast data and broadcast setting information from a broadcasting system or a mobile communication service system. The broadcast setting information includes broadcast time information and advertisement data output period information of a broadcast program corresponding to the broadcast data. The received broadcast data is outputted. Whether a current time corresponds to the advertisement data output period information is determined. If the current time corresponds to the advertisement data output period information, a request for transmission of advertisement data is transmitted to an advertisement server. Once advertisement data is received from the advertisement server, outputting the broadcast data and the received advertisement data is stopped. Whether a current time corresponds to the broadcast time information is determined, and if the current time corresponds to the broadcast time information, outputting the advertisement data is stopped, and broadcast data received from the broadcasting system or the mobile communication service system is outputted.

The above program may also transmit a request to stop transmitting advertisement data to the advertisement server if a current time corresponds to the broadcast time information.

The advertisement server extracts advertisement data corresponding to location information, received by requesting location information of the user terminal to the mobile communication service system, and transmits the advertisement data to the user terminal.

The above program may execute one or more of the following steps. For example, a purchase request instruction may be received from the user. Purchase request information may be generated using an advertisement ID of advertisement data, outputted when the purchase request instruction is inputted, and pre-stored terminal identification information. The generated purchase request information may be transmitted to the mobile communication service system or the advertisement server.

Another inventive aspect is a method of providing broadcast data to a user terminal being in data communication with a mobile communication service system, the method comprising: i) storing at least one advertisement data, ii) receiving broadcast data and broadcast setting information from a broadcasting system via a communication network, wherein the broadcast setting information includes broadcast time information and advertisement data output period information of a broadcast program corresponding to the broadcast data, iii) transmitting the broadcast data and the broadcast setting information to a user terminal via the communication network, iv) receiving a request for transmission of advertisement data from the user terminal, v) extracting at least one advertisement data and vi) transmitting the extracted advertisement data to the user terminal via the communication network, wherein the transmitted advertisement data is configured such that the user terminal outputs the advertisement data only during a period corresponding to the advertisement data output period information.

Another inventive aspect is a method of providing broadcast data to a user terminal being in data communication with a mobile communication system, the method comprising: i) storing at least one advertisement data, ii) receiving broadcast data and broadcast setting information from a broadcasting system via a communication network, wherein the broadcast setting information includes broadcast time information and advertisement data output period information of a broadcast program corresponding to the broadcast data, iii) transmitting the broadcast data to a user terminal via the communication network, iv) determining if a current time corresponds to the advertisement data output period information, v) extracting at least one advertisement data if the current time corresponds to the advertisement data output period information and vi) transmitting the extracted advertisement data to the user terminal via the communication network.

Another inventive aspect is a user terminal for providing broadcast data received from a mobile communication system, the terminal comprising: i) a transceiver configured to receive advertisement data from an advertisement server via a communication network, ii) a signal processor configured to convert broadcast data, received from a broadcasting system via a communication network, to first voice data and first video data in a predetermined format, iii) a memory configured to store terminal identification information and broadcast setting information corresponding to the broadcast data received from the broadcasting system or a mobile communication service system, wherein the broadcast setting information includes broadcast time information and advertisement data output period information of a broadcast program corresponding to the broadcast data, iv) a speaker configured to output the first voice data, v) a monitor configured to output the first video data and vi) a converter configured to convert the advertisement data to second voice data and second video data in a predetermined format, and output the converted second data via the speaker and the monitor, if a current time corresponds to the advertisement data output period information.

Still another inventive aspect is one or more processor-readable storage devices having processor-readable code embodied on the processor-readable storage devices, the processor-readable code for programming one or more processors to perform a method of outputting broadcast data, in a user terminal, received from a mobile communication service system, the method comprising: i) storing at least one advertisement data received from an advertisement server via a communication network, ii) receiving broadcast data and broadcast setting information from a broadcasting system or a mobile communication service system, wherein the broadcast setting information includes broadcast time information and advertisement data output period information of a broadcast program corresponding to the broadcast data, iii) outputting the received broadcast data, iv) determining if a current time corresponds to the advertisement data output period information, v) stopping outputting the broadcast data, and outputting at least part of the at least one advertisement data, if the current time corresponds to the advertisement data output period information, vi) determining if a current time corresponds to the broadcast time information and vii) outputting broadcast data received from the broadcasting system or the mobile communication service system if the current time corresponds to the broadcast time information.

Still another inventive aspect is one or more processor-readable storage devices having processor-readable code embodied on the processor-readable storage devices, the processor-readable code for programming one or more processors to perform a method of outputting broadcast data, in a user terminal, received from a mobile communication service system, the method comprising: i) receiving broadcast data and broadcast setting information from a broadcasting system or a mobile communication service system, wherein the broadcast setting information includes broadcast time information and advertisement data output period information of a broadcast program corresponding to the broadcast data, ii) outputting the received broadcast data, iii) determining if a current time corresponds to the advertisement data output period information, iv) transmitting a request for transmission of advertisement data to an advertisement server if the current time corresponds to the advertisement data output period information, v) receiving advertisement data from an advertisement server, vi) stopping outputting the broadcast data, and outputting the received advertisement data, vii) determining if a current time corresponds to the broadcast time information and viii) stopping outputting the advertisement data, and outputting broadcast data received from the broadcasting system or the mobile communication service system, if the current time corresponds to the broadcast time information.

Still another inventive aspect is a method of providing broadcast data to a user terminal being in data communication with a mobile communication service system, the method comprising: i) transmitting broadcast data and broadcast setting information to the user terminal via a communication network, wherein the broadcast setting information comprises broadcast time information and advertisement data output period information of a broadcast program corresponding to the broadcast data and ii) transmitting advertisement data to the user terminal via the communication network, wherein the transmitted advertisement data is configured such that the user terminal outputs the advertisement data during a period corresponding to the advertisement data output period information.

Still another inventive aspect is a system for providing broadcast data to a user terminal being in data communication with a mobile communication service system, the system comprising: i) means for transmitting broadcast data and broadcast setting information to the user terminal via a communication network, wherein the broadcast setting information comprises broadcast time information and advertisement data output period information of a broadcast program corresponding to the broadcast data and ii) means for transmitting advertisement data to the user terminal via the communication network, wherein the transmitted advertisement data is configured such that the user terminal outputs the advertisement data during a period corresponding to the advertisement data output period information.

DESCRIPTION OF CERTAIN INVENTIVE EMBODIMENTS

Broadcasting data transmitted through a broadcasting system is received by and displayed on a user terminal of a traveling user. Thus, a user can receive a broadcasting service even while he is traveling. However, when a typical sky wave broadcasting service is provided by use of a user terminal equipped with a broadcast receiving module, the received broadcast data is simply displayed on the user terminal, which does not determine whether the data is program data or advertisement data. Since the typical sky wave broadcasting service using user terminals indiscriminately displays all of the data provided by broadcasters on the user terminal, there has been little room for mobile communication service providers or independent advertisers to launch a business through independent advertisements.

Moreover, terrestrial wave DMB, satellite DMB, and broadcasting services through other wireless networks are available, but the service providers could only deliver the data (i.e., programs and advertisement data) and have been limited from pursuing business through independent advertisements.

Below, embodiments of the present invention will be described with reference to accompanying drawings. To aid the overall understanding, same means, regardless of the figure numbers, are given identical reference numerals throughout the description.

Figure 1:
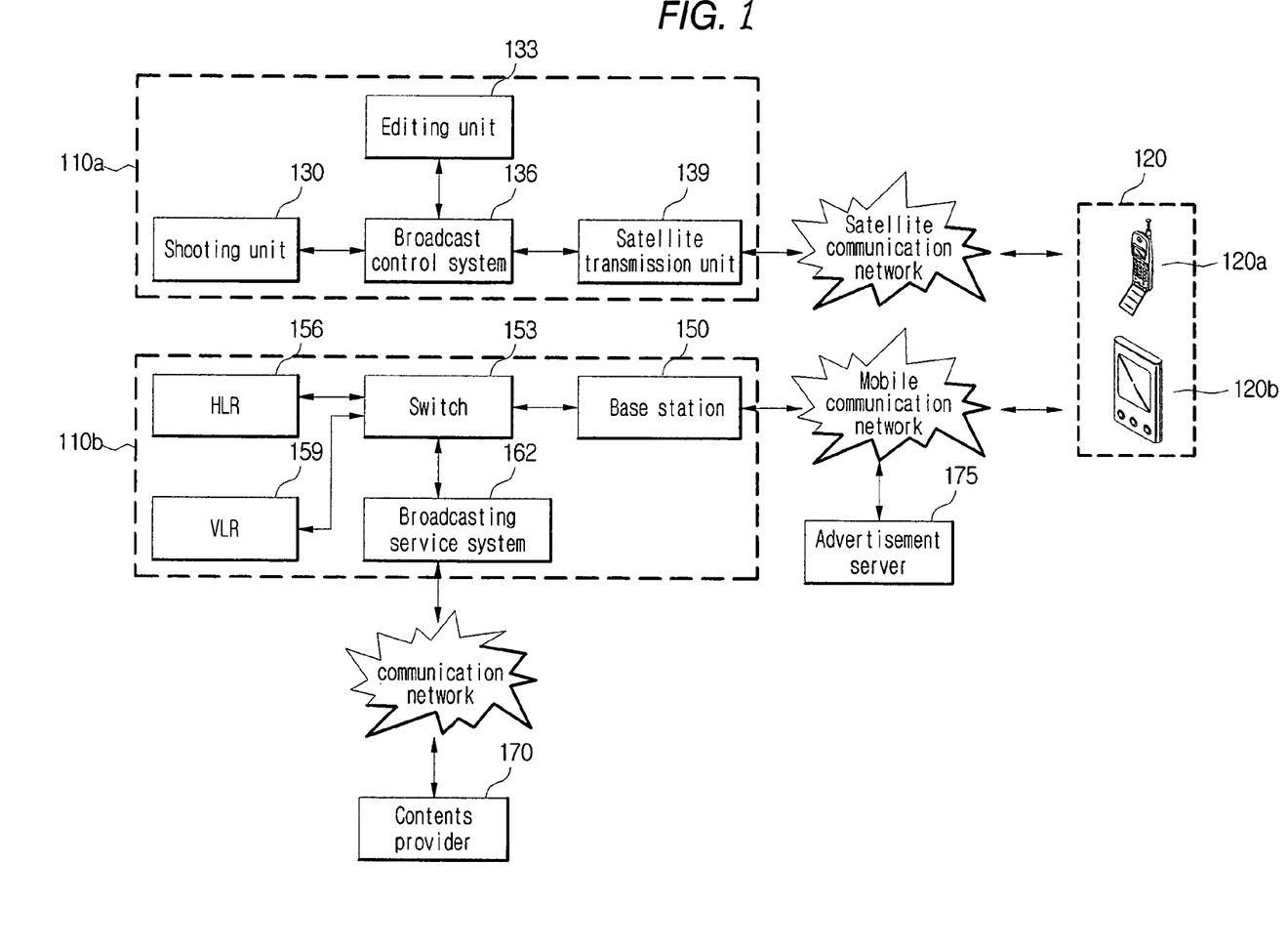
FIG. 1 shows a structural diagram of an overall system for executing a method for displaying an independent advertisement during broadcasting, based on one embodiment of the present invention.

FIG. 1 is a structural diagram of an overall system for executing a method for displaying an independent advertisement during broadcasting, based on one embodiment of the present invention.

Referring to FIG. 1, the system comprises at least one broadcasting system 110a, 110b, user terminal 120, contents provider 170, and advertisement server 175.

Generally, transmission methods of broadcasting services include sky wave broadcasting, in which the broadcast data is sent through radio waves transmitted from ground antennas, cable broadcasting, in which the broadcast data is sent through cables, and satellite broadcasting, in which the broadcast data is sent through radio waves transmitted from satellites.

FIG. 1 only illustrates a satellite broadcasting system as a first broadcasting system 110a and a mobile communication service system, in which the broadcast data is sent through a mobile communication network, as a second broadcasting system 110b. However, any broadcasting system may be used as long as it can send the broadcast data to a user terminal 120 through a communication network. In this description, the reference numeral 110b will refer to a second broadcasting system or a mobile communication service system, depending on its function.

The first broadcasting system 110a comprises a shooting unit 130, which shoots scenes to create broadcast data, an editing unit 133, which edits the shot broadcast data, a broadcast control system 136, which controls overall operations regarding broadcast transmission, including creating and editing broadcast data and transmitting the edited broadcast data via various media, and a satellite transmission unit 139, which sends broadcast data in wireless signals to a broadcasting satellite (not illustrated).

The first broadcasting system 110a may further comprise a ground transmitting unit, which is for delivering broadcast data to sky wave via antenna, a cable transmitting unit, which delivers broadcast data to cable TV through coaxial cables or fiber-optic cables, and a network transmitting unit, which transmits through the Internet the broadcast converted to the broadcast media data. The broadcast control system 136 creates broadcast setting information (e.g., program schedule, advertisement schedule between programs) corresponding to the transmitted broadcast data and sends to a user terminal 120 through a transmission medium such as the satellite transmission unit 139. The broadcast setting information can be sent as separate data from broadcast data, as part (e.g., information inserted in the header) of broadcast data, or as combined data with broadcast data. It should be apparent that there is no restriction on the means of transmission as long as the broadcast setting information can be received by a user terminal 120. Since means for transmitting broadcast setting information is not closely related to the essence of the subject invention, no further details will be described here.

The second broadcasting system 110b can comprise a base station 150, a switch 153, a home location register (HLR) 156, a visitor location register (VLR) 159, and a broadcasting service system 162. Although not illustrated in FIG. 1, it should be apparent that the second broadcasting system 110b, which is a mobile communication service system having a broadcasting service function, additionally includes a base station controller (BSC) and an inter-working function (IWF).

The base station 150 is arranged in units of cell, and transmits a call request from the user terminal 120 to the switch 153 or registers the location of a user terminal 120 within the controlled cell area. The location registration is a process of informing the location status, identifier, and slot cycle of a user terminal 120 to the switch 153 through the base station 150. This is a process for effectively paging a user terminal 120 when the base station 150 wants to set a forwarding call to any user terminal 120. The location registration of a user terminal 120 is performed when the user terminal 120 is turned on or off, when the user terminal 120 moves from one base station 150 to another, or when parameters of the user terminal 120 change.

The switch 153 has a management function, enabling efficient use by base stations 150, and an inter-working function with switches in a public telephone network. Once the location of a user terminal 120 is registered through a base station 150, the switch 153 temporarily saves the subscriber information of the user terminal 120 in the VLR 159 within the switch 153 and then requests location registration of the user terminal 120 to the HLR 156.

The HLR 156 is a database storing a service profile regarding the subscriber information of the user terminal 120, including the phone number, mobile identification number (MIN), and electronic serial number (ESN) of the user terminal 120. The HLR 156 performs a function of storing the subscriber information, including the information on the base station 150 and the switch 153 in which the user terminal is located.

The broadcasting service system 162 is used to provide broadcast data to a user terminal 120 through a mobile communication network. The contents provider 170 provides contents needed for broadcasting services. The broadcasting service system 162 also creates broadcast setting information (e.g., air time of a broadcast program, commercial time between broadcast programs) corresponding to the transmitted broadcast data and sends to a user terminal 120 through a base station 150. The broadcast setting information may be sent as separate data from the broadcast data, as part (e.g., information inserted in the header) of the broadcast data, or as combined data with the broadcast data. It should be apparent that there is no restriction on the means of transmission as long as the broadcast setting information can be received by a user terminal 120.

Although FIG. 1 is described with an assumption that there is an independent broadcasting service system 162 within the second broadcasting system 110b, the broadcasting service system 162 may be omitted. In other words, the switch 153 of the second broadcasting system 110b can be combined with the broadcast control system 136 of the first broadcasting system 110a either wirelessly or through wires to have the second broadcasting system (110b) send the broadcast data (and/or broadcast setting information) provided by the first broadcasting system (110a) to a user terminal 120 through a mobile communication network.

Since the structure and format of broadcast data for transmitting broadcast data to a user terminal 120 from the first broadcasting system 110a and/or second broadcasting system 110b are not related to the essence of the subject invention, no further details will be described here.

The user terminal 120 displays the broadcast data received from the first broadcasting system 110a and/or second broadcasting system 110b, and displays the real-time advertisement data received from the advertisement server 175 or pre-stored advertisement data during the commercial time between broadcast programs or after the end of a broadcast program. The user terminal 120 may be any device, for example, a mobile communication terminal 120a, a PDA 120b, and a PMP, which can perform the above functions. The structure of a user terminal 120 will be described in detail with reference to FIG. 2.

The advertisement server 175 provides advertisement data, to be displayed on a user terminal 120 during the commercial time between or after broadcast programs, through a mobile communication network. It should be apparent that the advertisement server 175 can be a part of a mobile communication service system 110b. The functions and uses of the advertisement server 175 will become better understood later through description with reference to relevant figures.

Figure 2:
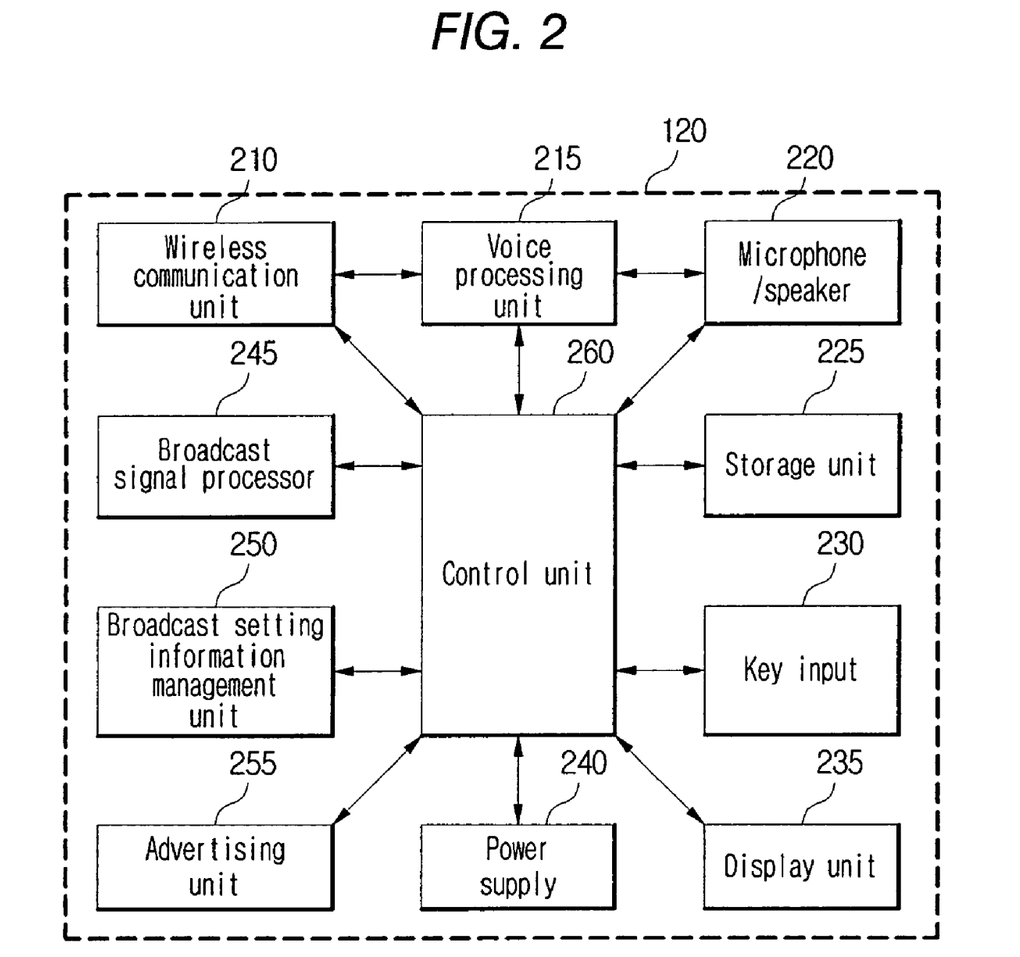
FIG. 2 shows a block diagram for the structure of a user terminal based on one embodiment of the present invention.

FIG. 2 is a block diagram showing the structure of a user terminal 120 based on one embodiment of the present invention.

Referring to FIG. 2, the user terminal 120 comprises a wireless communication unit 210, voice processing unit 215, microphone/speaker 220, storage unit 225, key input 230, display unit 235, power supply 240, broadcast signal processor 245, broadcast setting information management unit 250, advertising unit 255, and control unit 260. Some elements (e.g., broadcast setting information management unit 250, advertising unit 255) of the user terminal illustrated in FIG. 2 may be realized in the form of software that is designed to execute the same functions.

The wireless communication unit 210 is coupled with an antenna (not illustrated) to receive a wireless signal (e.g., voice data) from the mobile communication service system 110b and deliver to the microphone/speaker 220 or storage unit 225, and sends, for example, voice signals inputted through the microphone/speaker 220 to the mobile communication service system 110b through the antenna. The wireless communication unit 210 can receive broadcast setting information corresponding to broadcast data from the mobile communication service system 110b.

The voice processing unit 215, processes voice signals received through the wireless communication unit and outputs through the microphone/speaker 220, and processes voice signals inputted through the microphone/speaker 220 and delivers to the wireless communication unit 210.

The microphone/speaker 220 can include a speaker and microphone. The speaker is means for outputting the voice of other users received through the antenna from the mobile communication service system 110b or the voice data of broadcast data processed by the broadcast signal processor 245, and the microphone is means for inputting the voice of a user of the user terminal 120.

The storage unit 220 stores the operating system of a user terminal 120, the terminal identification information (e.g., ESN), advertisement data received from the advertisement server 175, and broadcast setting information received from the first broadcast system 110a and/or second broadcast system 110b. The advertisement data can be stored according to the advertisement ID (i.e., advertisement data identifier information) and location ID (i.e., location information for proper display of the advertisement data). The storage unit 225 can further store messages (e.g., "If you want to purchase the currently-advertised product, please enter the quantity, then press the Magic N button.") to be displayed on the display unit 235 while the advertisement data is displayed and key button setting information (e.g., recognizing the Magic N button as the purchase request button while advertisement data is displayed). The storage unit 225 can also store a program that uses the quantity of purchase request, advertisement ID, and terminal identification information, when the purchase request button is pressed by the user, to create purchase request information, which is then sent to a purchase server (not illustrated) through the wireless communication unit 210. The purchase server may be structured to be included in a mobile communication service system 110b or to be accessed through the wireless Internet access function of a mobile communication service system. Since the steps for processing the purchase request received from a user terminal 120 by the purchase server are well known to those skilled in the art, no further description will be provided here. The storage unit 225 can comprise a plurality of storage units or a plurality of storage areas, and the stored data can be stored in different storage units or storage areas, depending on the format or type.

The key input 230, having a plurality of key buttons, receives instructions on broadcast channel selection information, purchase request, and advertising data download from the user. Since the functions of key input 230, equipped in a user terminal 120, can be adequately understood through conventional functions as well as the description that follows below, detailed description will not be provided here.

The display unit 235 displays the operation status, selected broadcast data, and advertisement data according to the input through the key input 230. The display unit 235 can be, for example, an LCD screen.

The power supply 240 supplies the power to enable the user terminal 120 to operate. The power supply 240 can be, for example, a connection terminal for access to a battery or solar cells.

The broadcast signal processor 245 converts the broadcast data received from the first broadcast system 110a and/or second broadcast system 110b to a format compatible to be outputted through the speaker and display unit 235. Specifically, the broadcast signal processor 245 can convert RF signals received through the antenna to intermediate frequency signals, and analog intermediate frequency signals to digital signals, and restore voice, data, and image from the converted digital signals. The broadcast signal processor 245 can be structured in various ways due to variations in the path of receiving broadcast data and the format of broadcast data. In case the broadcast setting information is received with broadcast data, the broadcast signal processor 245 stores the received broadcast setting information in the storage unit 225.

The broadcast setting information management unit 250 uses the broadcast setting information, received from the first broadcasting system 110a and/or second broadcasting system 110b and stored in the storage unit 225, to determine whether it is the point of time to start to output broadcast data. If it is the time to start to output broadcast data, the broadcast setting information management unit 250 instructs the advertising unit 255 to start outputting the broadcast data. The broadcast setting information management unit 250 also determines if it is the point of time to finish outputting broadcast data, using the broadcast setting information. If it is the time to finish outputting broadcast data, the broadcast setting information management unit 250 instructs the advertising unit 255 to finish outputting the broadcast data.

An example for a method for determining by the broadcast setting information management unit 250 whether it is the time to output advertisement data can be determining whether the current time is set as a commercial time (advertisement data output period, i.e., the time between the beginning and ending of broadcast data output that is preset to display the advertisement between broadcast programs or after the end of a broadcast program) in the broadcast setting information. For example, if program A is broadcast between 10:00 and 10:50, followed by program B starting at 11:00, the 10-minute period between 10:50 and 11:00 can be an advertisement data output period. With an instruction by the broadcast setting information management unit 250 to end the output of advertisement data, the advertising unit 255 stops outputting the advertisement, and the broadcast data processed by the broadcast signal processor 245 is outputted through the speaker and display unit 235. To determine whether to output advertisement data or not, the broadcast setting information management unit 250 can also use a method of determining whether signals of predetermined frequency band indicating the output point of advertisement data are included in the broadcast data.

Once output of advertisement data is instructed by the broadcast setting information management unit 250, the advertising unit 255 has one of the advertisement data among advertisement data stored in the storage unit 225 or the advertisement data received from the advertisement server 175 through a mobile communication network output through the speaker or display on the display unit 235.

Although not illustrated in FIG. 2, the user terminal 120 based on one embodiment of the present invention can also have a purchase request information creating unit, which creates the purchase request information described above. The control unit 260 controls the operation of each element described above.

Figure 3:
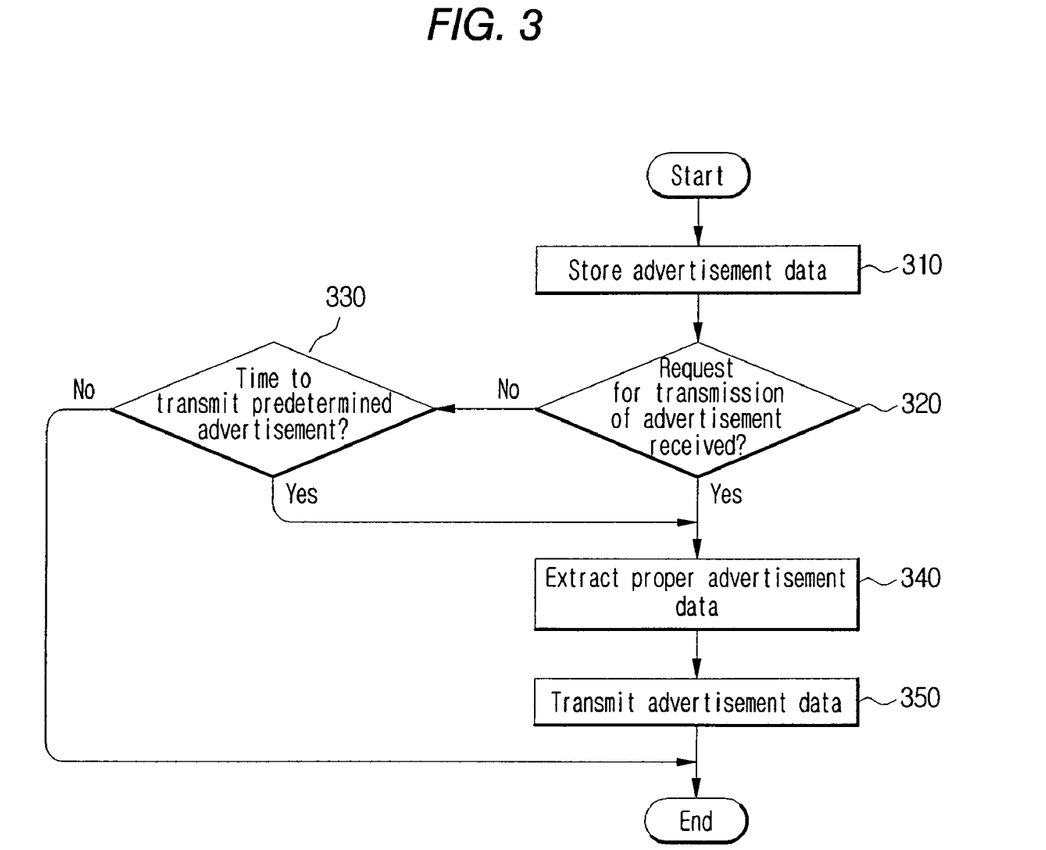
FIG. 3 shows a flowchart of a method for transmitting advertisement data by an advertisement server, based on one embodiment of the present invention.

The flowchart in FIG. 3 shows a method for transmitting advertisement data by an advertisement server 175, based on one embodiment of the present invention.

Referring to FIG. 3, the advertisement server 175 determines in step 320 if request for transmission of an advertisement is received from the user terminal 120, while one or more of the advertisement data are stored in the advertisement database in step 310. The user terminal 120 sends a request for transmission of an advertisement to the advertisement server 175 in order to download in advance and store the advertisement to output during the advertisement data output period in the storage unit 225, or to receive the advertisement data real time at the beginning of the advertisement data output. The advertisement server 175 continuously updates and stores the advertisement data to be displayed through the user terminal 120 in the advertisement database. Of course, the advertisement server 175 can automatically send the advertisement data to the user terminal 120 if it can recognize the beginning of the advertisement data output through broadcast setting information, although a request for transmission of an advertisement for the real-time output of the advertisement data is not received from the user terminal 120 during the advertisement data output period.

If a request for transmission of an advertisement is not received, step 330 is performed to determine if it is a predetermined time for transmitting an advertisement. By sending the advertisement data to the user terminal 120 to have the advertisement data updated or newly stored at every predetermined time for transmitting an advertisement, the advertisement data can be outputted to meet the advertisement condition (e.g., the term of advertisement based on the agreement with the advertiser), and the user terminal 120 does not have to access to the advertisement server 175 to receive the advertisement data.

If a request for transmission of an advertisement is received or it is a predetermined time to transmit an advertisement, the advertisement server 175 extracts proper advertisement data from the advertisement database in step 340 to send to the user terminal 120.

The advertisement server 175 can extract proper advertisement data to send to the user terminal 120, according to the time the advertisement data was stored, the current location of the user terminal 120, whether or not the advertisement data is outputted through the relevant user terminal 120, and whether or not the advertisement data corresponds to the user areas of interest. Of course, the advertisement server 175 can use a multiple number of extraction conditions.

First, if the advertisement server 175 extracts the advertisement data based on the time the advertisement data was stored, the advertisement data that was most recently stored can be sent to the user terminal 120 first.

Next, if the advertisement server 175 extracts broadcast data based on the current location of the user terminal 120, the broadcast data could best correspond to the user location. As described earlier, the location information of the user terminal 120 can be provided by the mobile communication service system 110*b*, and the advertisement server 175 can be a part of the mobile communication service system 110*b*. By sending the extracted advertisement data with the location ID to the user terminal 120, the advertisement server 175 allows the user terminal 120 to make a reference to the location ID of the received and stored advertisement data and to extract and display the advertisement data corresponding to the current location. Since the method for recognizing the location information of a user terminal 120 and providing the recognized location information to the advertisement server 175 by the mobile communication service system 110*b* is well known to those of ordinary skill in the art, no description will be provided here.

The advertisement server 175 may exclusively extract and send advertisement data that are not displayed through the user terminal 120. For this, the advertisement server 175 can treat the advertisement data as outputted if the advertisement data has already been sent to the user terminal 120 or an advertisement ID is received from the user terminal 120. In the latter case, the user terminal 120 has to send a corresponding advertisement ID to the advertisement server 175 if any advertisement data is outputted.

The advertisement server 175 may exclusively extract and send the advertisement data corresponding to the user's areas of interest to the user terminal 120. The areas of interest can be set during the membership sign-up, and can be stored and managed as the subscriber information in the advertisement server 175 or mobile communication service system 110*b*.

It should be apparent that other varieties of advertisement data extraction conditions can be used.

In step 350, the advertisement server 175 sends the advertisement data extracted in step 340 to the user terminal 120 through a mobile communication network. The user terminal 120 either displays the received advertisement data real time or stores in the storage unit 225.

Figure 4:
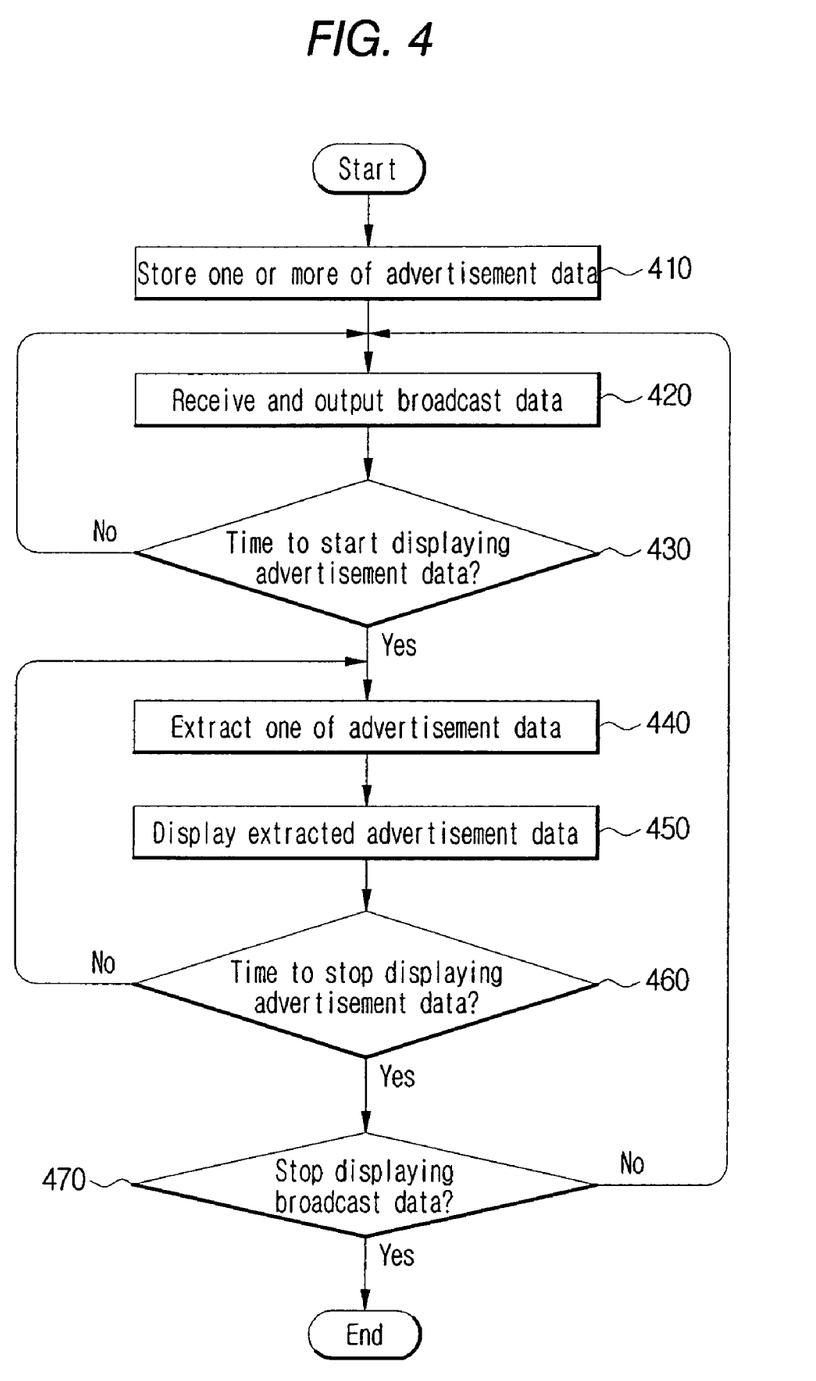
FIG. 4 shows a flowchart of a method for displaying advertisement data, based on one embodiment of the present invention.

The flowchart in FIG. 4 shows a method for displaying advertisement data, based one embodiment of the present invention.

Referring to FIG. 4, while one or more of advertisement data have been pre-received from the advertisement server 175 and are stored in the storage unit 225 in step 410, the user terminal 120 receives broadcast data from the first broadcasting system 110*a* or second broadcasting system 110*b* and outputs through the speaker and display unit 235 in step 420.

The broadcast data outputted in step 420 corresponds to a channel selection instruction entered through the key input 230 by the user.

In step 430, the user terminal 120 determines if the current time corresponds to an advertisement display time. The user terminal 120 may determine if the current time corresponds to an advertisement data output period (commercial time allocated in the middle of a first broadcast program or after the end of the first program prior to the start of a second broadcast program), using the broadcast time information included in the broadcast setting information. The user terminal 120 may also determine that the current time corresponds to an advertisement data output period if signals of a predetermined frequency band are included in the broadcast data received from the first broadcasting system 110a or second broadcasting system 110b.

If it is determined that the current time does not correspond to a time to start displaying advertisement data, step 420 is performed to continue receiving and outputting broadcast data.

If, however, the current time corresponds to a time to start displaying advertisement data, the user terminal 120 extracts advertisement data in step 440. Here, the user terminal 120 may either extract randomly any of the advertisement data stored in the storage unit 225 or extract according to the order of saving or displaying advertisement data.

Then, the user terminal outputs the extracted advertisement data through the speaker and display unit 235 in step 450.

In step 460, the user terminal 120 determines if the current time is a time to stop displaying advertisement data. The user terminal 120 may determine if the current time corresponds to the end point of an advertisement data output period (e.g., the beginning time of a second broadcast program after the end of a first program), using the broadcast time information included in the broadcast setting information. The user terminal 120 may also determine that the current time corresponds to a time to stop displaying advertisement data if signals of a predetermined frequency band are included in the broadcast data received from the first broadcasting system 110a or second broadcasting system 110b.

If the current time is not a time to stop displaying advertisement data, step 440 is performed again. It should be apparent that a plurality of advertisement data can be outputted during the advertisement data output period. When it becomes the time to stop displaying advertisement data while outputting the advertisement data, the broadcast data can be outputted after stopping the output of the advertisement data or after completing the output of the advertisement data.

However, if the current time is a time to stop displaying advertisement data, step 470 is performed to determine if an instruction to stop displaying broadcast data is inputted using the key input 230 by the user. In case the instruction is not received, step 420 is performed again. If the instruction is received, however, the process is terminated.

Described so far with reference to FIG. 4 is the method of displaying, either randomly or sequentially, advertisement data, stored in the storage unit 225, during an advertisement data output period, set by the broadcast setting information, while the user terminal 120 is displaying the broadcast data received from the first broadcasting system 110a or second broadcasting system 110b.

A user terminal 120 according to one embodiment of the present invention, however, can extract and output the advertisement data corresponding to the current location of the user terminal 120. Below is a brief description of this method.

At the starting point of displaying advertisement data, the user terminal 120 requests for and receives the current location information of the user terminal 120 from the mobile communication service system 110b. The location information can be a location ID. The user terminal 120 can be supplied with location information from the mobile communication service system 110b continuously while receiving and outputting broadcast data, in which case the latest location information is used at the starting point of displaying advertisement data.

The user terminal 120 extracts one or more of the advertisement data corresponding to the current location information among the group of advertisement data stored in the storage unit, and displays during the advertisement data output period. In this case, each of the advertisement data is stored in the storage unit 225 to correspond to each of the location information.

As such, the user terminal 120 can output the advertisement data that is most appropriate for the current location.

Figure 5:
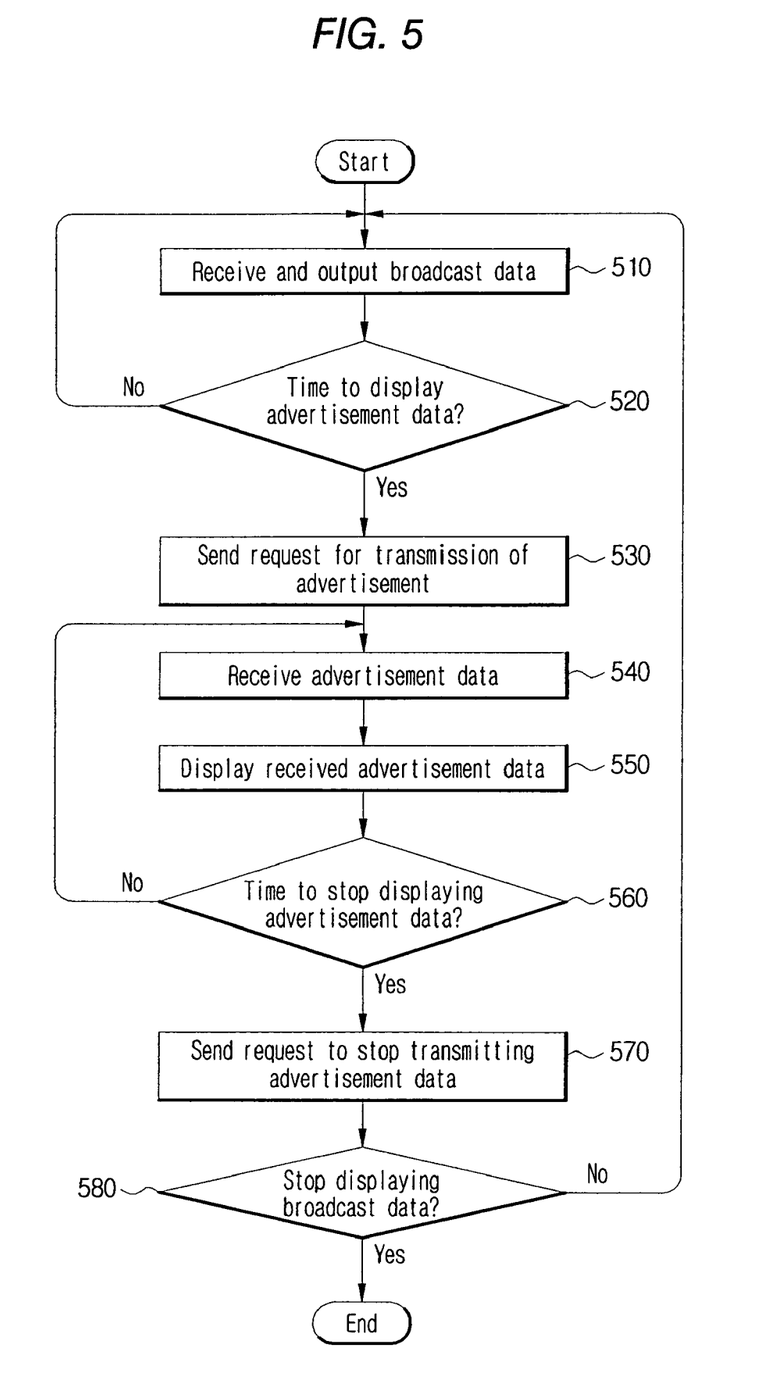
FIG. 5 shows a flowchart of a method for displaying advertisement data, based on another embodiment of the present invention.

FIG. 5 is a flowchart showing a method of displaying advertisement data, based on another embodiment of the present invention.

Referring to FIG. 5, the user terminal 120 receives broadcast data, in step 510, from the first broadcasting system 110a or second broadcasting system 110b and outputs through the speaker and display unit 235. The broadcast data outputted in step 510 corresponds to a channel selection instruction entered by the user using the key input 230.

In step 520, the user terminal 120 determines if the current time is a time to display advertisement data. The user terminal 120 may determine if the current time corresponds to an advertisement data output period (commercial time allocated in the middle of a first broadcast program or after the end of the first program prior to the start of a second broadcast program), using the broadcast time information included in the broadcast setting information. The user terminal 120 may also determine that the current time corresponds to an advertisement data output period if signals of a predetermined frequency band are included in the broadcast data received from the first broadcasting system 110a or second broadcasting system 110b.

If it is determined that the current time does not correspond to a time to start displaying advertisement data, step 510 is performed to continue receiving and outputting broadcast data.

If, however, the current time corresponds to a time to start displaying advertisement data, the user terminal 120 sends a request, in step 530, for transmission of advertisement data to the advertisement server 175 through a mobile communication network.

The user terminal 120 receives one of the advertisement data from the advertisement server 175 in step 540, and outputs the received advertisement data through the speaker and display unit 235 in step 550.

In step 560, the user terminal 120 determines if the current time is a time to stop displaying advertisement data. The user terminal 120 may determine if the current time corresponds to the end point of an advertisement data output period (e.g., the beginning time of a second broadcast program after the end of a first program), using the broadcast time information included in the broadcast setting information. The user terminal 120 may also determine that the current time corresponds to a time to stop displaying advertisement data if signals of a predetermined frequency band are included in the broadcast data received from the first broadcasting system 110a or second broadcasting system 110b.

If the current time is not a time to stop displaying advertisement data, step 540 (or step 530) is performed again.

If, however, the current time is a time to stop displaying advertisement data, step 570 is performed such that the user terminal 120 sends a request to the advertisement server 175 through a mobile communication network to stop transmitting advertisement.

Then in step 580, the user terminal 120 determines if an instruction to stop displaying broadcast data is inputted using the key input 230 by the user. In case the instruction is not received, step 510 is performed again. If the instruction is received, however, the process is terminated.

Described so far with reference to FIG. 5 is the method of displaying advertisement data, received real time from the advertisement server 175, during an advertisement data output period set by the broadcast setting information, while the user terminal 120 is displaying the broadcast data received from the first broadcasting system 110a or second broadcasting system 110b.

A user terminal 120 according to one embodiment of the present invention, however, can extract and output the advertisement data, corresponding to the current location of the user terminal 120, from the advertisement server 175. Below is a brief description of this method.

At the starting point of displaying advertisement data, the advertisement server 175 requests for and receives the information on current location of the user terminal 120 from the mobile communication service system 110b if the user terminal 120 sends a request for transmission of advertisement (this request may include a terminal identification information) to the advertisement server 175. The received location information may be a location ID.

The advertisement server 175 extracts advertisement data corresponding to the received location information and sends to the user terminal 120 through a mobile communication network.

As such, the user terminal 120 can output the advertisement data that is most appropriate for the current location.

So far, a method for displaying advertisement data, pre-stored in the storage unit 220, during an advertisement data output period (with reference to FIG. 4) and a method for receiving and displaying advertisement data real time from the advertisement server 175 (with reference to FIG. 5) have been described.

However, it should be apparent that not only can each method be executed independently but also it can be executed in combination. For example, after requesting the advertisement server 175 for transmission of advertisement data at the start of displaying advertisement data, advertisement data stored in the storage unit 225 can be outputted until advertisement data is received from the advertisement server 175. New advertisement data can be made to be stored in the storage unit 225 by deleting outputted advertisement data, once advertisement data is received from the advertisement server 175.

Figure 6:
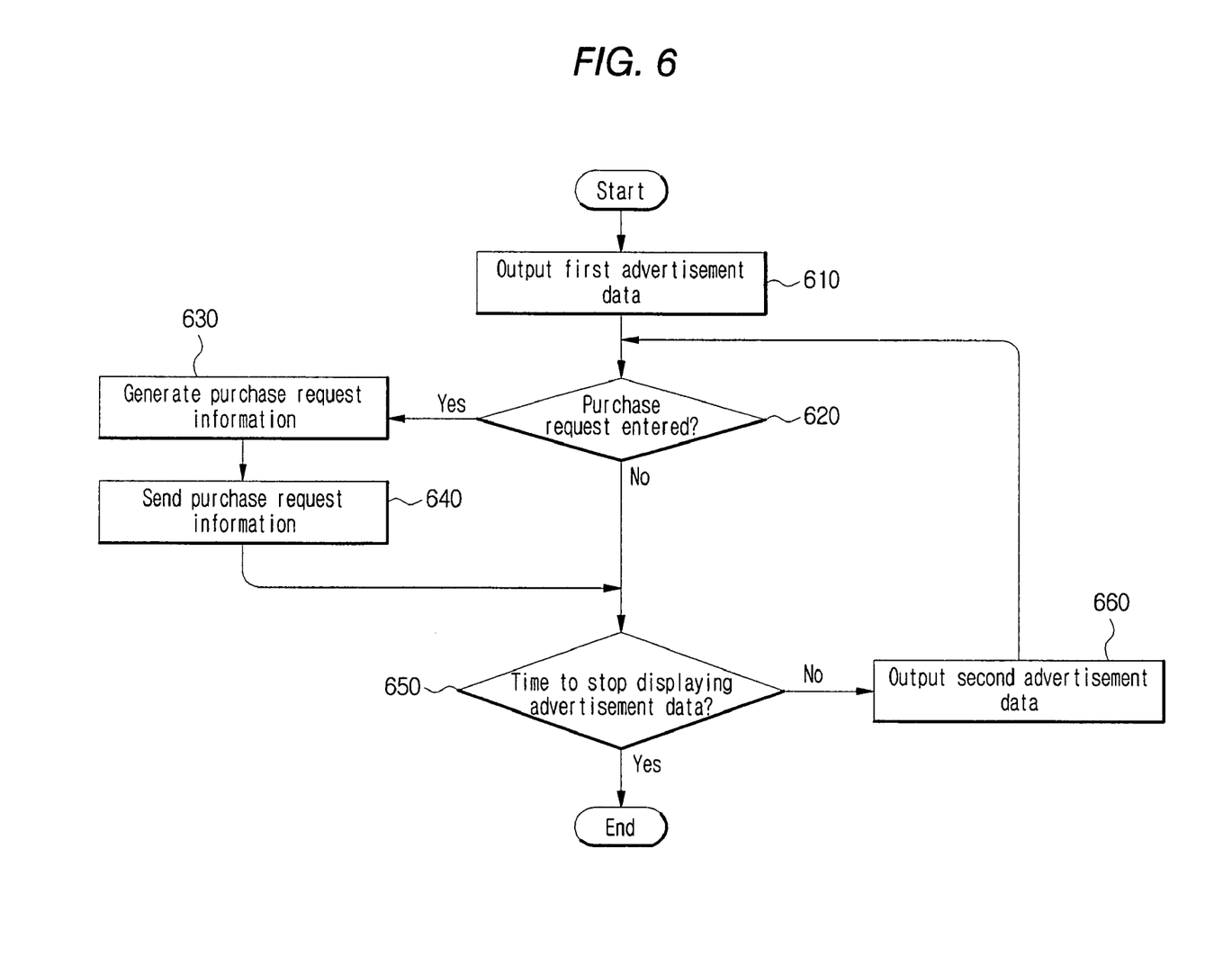
FIG. 6 shows a flowchart of a method for purchasing a product corresponding to the displayed advertisement data, based on yet another embodiment of the present invention.

The flowchart in FIG. 6 shows a method for purchasing a product corresponding to displayed advertisement data, based on yet another embodiment of the present invention.

Referring to FIG. 6, the user terminal 120 outputs, in step 610, one of the advertisement data stored in the storage unit 225 or the advertisement data received real time from the advertisement server 175 through the speaker and display unit 235. As described earlier, one or more of the advertisement data are outputted sequentially during an advertisement data output period.

In step 620, the user terminal 120 determines if the purchase request button, predesignated among the key buttons in the key input 230, is pressed by the user. The purchase request button can be, for example, the "Magic N" button. Step 620 can also determine if the quantity of requested purchase is entered using the key input 230 by the user. The quantity of requested purchase may be entered using the numeric buttons, and can be automatically recognized as "1" if only the purchase request button is entered without specifying the quantity. There can be various orders of entering the purchase request button and quantity, but if the quantity of requested purchase is entered later, a confirmation button may be also required to be pressed.

Once the purchase request button is pressed, the user terminal 120 creates, in step 630, purchase request information using the advertisement ID of the currently-outputted advertisement data, the quantity of requested purchase, and the terminal identification information, and sends the created purchase request information to a purchase server in step 640. The purchase server may be the same device as the advertisement server 175. The purchase server may also be a device equipped in a mobile communication service system 110b or a communication device accessed using the wireless Internet function.

In step 650, the user terminal 120 determines if the current time is a time to stop displaying advertisement data. If it is a time to stop displaying advertisement data, the advertisement data is stopped being displayed to allow broadcast data to be displayed. If it is not a time to stop displaying advertisement data, however, another advertisement data, stored in the storage unit 225 or received real time from the advertisement server 175, is outputted through the speaker and display unit 235, and step 620 is performed.

A method for displaying independent advertisement during broadcasting and a user terminal executing the method, based on one embodiment of the present invention, allow the delivery of targeted advertisement to the user during the commercial time of regular broadcasting by separating the advertising device from the broadcasting device, bringing the maximum advertisement effect.

At least one embodiment of the invention can attempt to achieve the maximum advertisement effect by allowing a user terminal to display an advertisement that is most appropriate for the current condition (e.g., time, location) among the stored advertisement data.

At least one embodiment of the invention can also attempt to simplify the purchasing procedure and promote the sales by having a request for purchase of a product, corresponding to the advertisement data, sent through a wireless communication network if a predesignated purchase request button is pressed when advertisement data is displayed.

At least one embodiment of the invention can also make the advertisement effective by displaying an advertisement corresponding to the location of a user terminal.

Furthermore, at least one embodiment of the invention allows the creation of a new revenue model through the separation of broadcasting entity and advertising entity.

Although certain embodiments of the present invention have been described, any person of ordinary skill in the art shall be able to understand that there can be a very large number of permutations and variations, all of which are within the spirit and scope of the present invention.

What is claimed is:

1. A method of providing broadcast data to a user terminal being in data communication with a mobile communication service system, the method comprising:

storing at least one advertisement data;

receiving broadcast data and broadcast setting information from a broadcasting system via a communication network, wherein the broadcast setting information includes broadcast time information and advertisement data output period information of a broadcast program corresponding to the broadcast data;

transmitting the broadcast data and the broadcast setting information to a user terminal via the communication network;

receiving a request for transmission of advertisement data from the user terminal;

extracting at least one advertisement data; and transmitting the extracted advertisement data to the user terminal via the communication network, wherein the transmitted advertisement data is configured such that the user terminal outputs the advertisement data only during a period corresponding to the advertisement data output period information, and wherein the user terminal generates purchase request information, for purchase of a product corresponding to the transmitted advertisement data, from at least identification information of the user terminal and the corresponding advertisement data.

2. The method of claim 1, wherein the extracting comprises:

extracting location information of the user terminal; and extracting advertisement data corresponding to the location information.

3. A method of providing broadcast data to a user terminal being in data communication with a mobile communication system, the method comprising:

storing at least one advertisement data;

receiving broadcast data and broadcast setting information from a broadcasting system via a communication network, wherein the broadcast setting information includes broadcast time information and advertisement data output period information of a broadcast program corresponding to the broadcast data;

transmitting the broadcast data to a user terminal via the communication network;

determining if a current time corresponds to the advertisement data output period information;

extracting at least one advertisement data if the current time corresponds to the advertisement data output period information; and transmitting the extracted advertisement data to the user terminal via the communication network, wherein the user terminal generates purchase request information for purchase of a product corresponding to the extracted advertisement data, from at least identification information of the user terminal and the corresponding advertisement data.

4. The method of claim 3, wherein the extracting comprises:

extracting location information of the user terminal; and extracting advertisement data corresponding to the location information.

5. A user terminal for providing broadcast data received from a mobile communication system, the terminal comprising:

a transceiver configured to receive advertisement data from an advertisement server via a communication network;

a signal processor configured to convert broadcast data, received from a broadcasting system via a communication network, to first voice data and first video data in a predetermined format;

a memory configured to store terminal identification information and broadcast setting information corresponding to the broadcast data received from the broadcasting system or a mobile communication service system, wherein the broadcast setting information includes broadcast time information and advertisement data output period information of a broadcast program corresponding to the broadcast data;

a speaker configured to output the first voice data;

a monitor configured to output the first video data;

a converter configured to convert the advertisement data to second voice data and second video data in a predetermined format, and output the converted second data via the speaker and the monitor, if a current time corresponds to the advertisement data output period information;

an input component configured to receive a channel selection instruction and a request for purchase;

a generator configured to generate, in response to a request for purchase, purchase request information from at least identification information of the user terminal and the corresponding advertisement data; and a transmitter configured to transmit the generated purchase request information to a purchase request processor.

6. The user terminal of claim 5, wherein the memory is further configured to store at least one advertisement data received via the transceiver, and wherein the converter is further configured to output the advertisement data stored in the memory according to the advertisement data output period information.

7. The user terminal of claim 5, wherein the user terminal is one of the following: a mobile communication terminal, a personal digital assistant and a portable multimedia player.

8. One or more processor-readable storage devices having processor-readable code embodied on the processor-readable storage devices, the processor-readable code for programming one or more processors to perform a method of outputting broadcast data, in a user terminal, received from a mobile communication service system, the method comprising:

storing at least one advertisement data received from an advertisement server via a communication network;

receiving broadcast data and broadcast setting information from a broadcasting system or a mobile communication service system, wherein the broadcast setting information includes broadcast time information and advertisement data output period information of a broadcast program corresponding to the broadcast data;

outputting the received broadcast data;

determining if a current time corresponds to the advertisement data output period information;

stopping outputting the broadcast data, and outputting at least part of the at least one advertisement data, if the current time corresponds to the advertisement data output period information;

determining if a current time corresponds to the broadcast time information;

outputting broadcast data received from the broadcasting system or the mobile communication service system if the current time corresponds to the broadcast time information;

receiving a purchase request instruction for purchase of a product corresponding to the advertisement data;

generating purchase request information from an advertisement ID corresponding to the advertisement data and pre-stored terminal identification information; and transmitting the generated purchase request information to a service system.

9. The storage devices of claim 8, wherein the stored advertisement data corresponds to each of location information indicating a proper output location, wherein the outputting the stored advertisement data comprises:

transmitting a request for location information of the user terminal to the mobile communication service system;

receiving location information of the user terminal from the mobile communication service system;

extracting advertisement data corresponding to the received location information; and outputting the extracted advertisement data.

10. One or more processor-readable storage devices having processor-readable code embodied on the processor-readable storage devices, the processor-readable code for programming one or more processors to perform a method of outputting broadcast data, in a user terminal, received from a mobile communication service system, the method comprising:

receiving broadcast data and broadcast setting information from a broadcasting system or a mobile communication service system, wherein the broadcast setting information includes broadcast time information and advertisement data output period information of a broadcast program corresponding to the broadcast data;

outputting the received broadcast data;

determining if a current time corresponds to the advertisement data output period information;

transmitting a request for transmission of advertisement data to an advertisement server if the current time corresponds to the advertisement data output period information;

receiving advertisement data from an advertisement server;

stopping outputting the broadcast data, and outputting the received advertisement data;

determining if a current time corresponds to the broadcast time information;

stopping outputting the advertisement data, and outputting broadcast data received from the broadcasting system or the mobile communication service system, if the current time corresponds to the broadcast time information;

receiving a purchase request instruction for purchase of a product corresponding to the advertisement data;

generating purchase request information from an advertisement ID corresponding to the advertisement data and pre-stored terminal identification information; and transmitting the generated purchase request information to a service system.

11. The storage devices of claim 10, further comprising transmitting a request to stop transmitting advertisement data to the advertisement server if a current time corresponds to the broadcast time information.

12. The storage devices of claim 10, wherein the advertisement server is configured to extract advertisement data corresponding to location information, received by requesting location information of the user terminal to the mobile communication service system, and transmit the advertisement data to the user terminal.

13. A method of providing broadcast data to a user terminal being in data communication with a mobile communication service system, the method comprising:

transmitting broadcast data and broadcast setting information to the user terminal via a communication network, wherein the broadcast setting information comprises broadcast time information and advertisement data output period information of a broadcast program corresponding to the broadcast data; and transmitting advertisement data to the user terminal via the communication network, wherein the transmitted advertisement data is configured such that the user terminal outputs the advertisement data during a period corresponding to the advertisement data output period information and the user terminal generates purchase request information for purchase of a product corresponding to the advertisement data using at least the user terminal identification information and an advertisement ID corresponding to the advertisement data.

14. The method of claim 13, wherein the transmitting advertisement data is performed in response to a request for transmission of advertisement data received from the user terminal.

15. The method of claim 13, wherein the transmitting advertisement data comprises:

determining if a current time corresponds to the advertisement data output period information;

extracting at least one advertisement data if the current time corresponds to the advertisement data output period information; and transmitting the extracted advertisement data to the user terminal via the communication network.

16. A system for providing broadcast data to a user terminal being in data communication with a mobile communication service system, the system comprising:

means for transmitting broadcast data and broadcast setting information to the user terminal via a communication network, wherein the broadcast setting information comprises broadcast time information and advertisement data output period information of a broadcast program corresponding to the broadcast data; and means for transmitting advertisement data to the user terminal via the communication network, wherein the transmitted advertisement data is configured such that the user terminal outputs the advertisement data during a period corresponding to the advertisement data output period information and the user terminal generates purchase request information for purchase of a product corresponding to the advertisement data using at least the user terminal identification information and an advertisement ID corresponding to the advertisement data.

* * * * *